No. 704,055. Patented July 8, 1902.
C. LEISTNER.
MACHINE FOR MAKING GLASS BOTTLES.
(Application filed Aug. 31, 1901.)
(No Model.) 8 Sheets—Sheet 1.

No. 704,055. Patented July 8, 1902.
C. LEISTNER.
MACHINE FOR MAKING GLASS BOTTLES.
(Application filed Aug. 31, 1901.)
(No Model.) 8 Sheets—Sheet 2.

Witnesses
Inventor.
Carl Leistner
Attorney.

No. 704,055. Patented July 8, 1902.
C. LEISTNER.
MACHINE FOR MAKING GLASS BOTTLES.
(Application filed Aug. 31, 1901.)
(No Model.) 8 Sheets—Sheet 4.

No. 704,055. Patented July 8, 1902.
C. LEISTNER.
MACHINE FOR MAKING GLASS BOTTLES.
(Application filed Aug. 31, 1901.)
(No Model.) 8 Sheets—Sheet 5.

Witnesses
C. H. Walker.
H. M. Long.

Inventor.
Carl Leistner
by Ewin,
Attorney

No. 704,055. Patented July 8, 1902.
C. LEISTNER.
MACHINE FOR MAKING GLASS BOTTLES.
(Application filed Aug. 31, 1901.)
(No Model.) 8 Sheets—Sheet 6.

Witnesses
Inventor
Carl Leistner
Attorney

UNITED STATES PATENT OFFICE.

CARL LEISTNER, OF LONDON, ENGLAND.

MACHINE FOR MAKING GLASS BOTTLES.

SPECIFICATION forming part of Letters Patent No. 704,055, dated July 8, 1902.

Application filed August 31, 1901. Serial No. 73,987. (No model.)

*To all whom it may concern:*

Be it known that I, CARL LEISTNER, a subject of the Emperor of Germany, and a resident of 22 Bloomfield Road Bow, London, E., England, have invented a new and useful Improvement in Machines for Making Glass Bottles, of which the following is a specification.

This invention relates to machines for making glass bottles by casting the head or "neck" and then blowing the bottle in suitable molds; and it consists in certain novel combinations of parts hereinafter described and claimed.

The leading object of the invention is to provide means for making bottles by machinery with greater speed than has heretofore been practicable.

Other objects are to provide by improved means for shaping the lip and mouth wholly by casting; for rotating the lump of glass within the parison-mold; for swinging the parison in the open air, as in mouth-blowing; for making turned bottles, if desired; for insuring against injury to the bottles by excessive air-pressure; for controlling the rotation of the glass and the admission of air by one and the same hand; for simultaneously opening and closing the parison and blowing molds, and for delivering each blown bottle at once, so as to free the machine for the succeeding operation.

Eight sheets of drawings accompany this specification as part thereof.

Like letters and numbers refer to like parts in all the figures.

Figure 1:
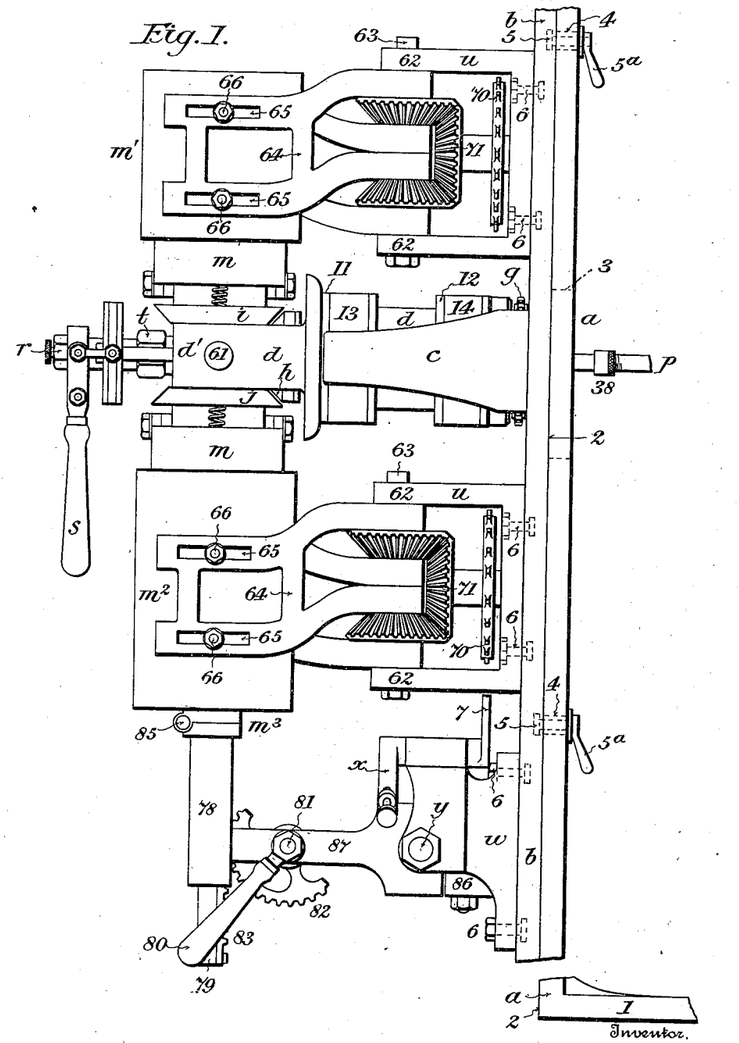
Figure 1, Sheet 1, is a side elevation of the improved machine, showing the parts in working condition with the molds closed.
Figures 2, 11, 18:
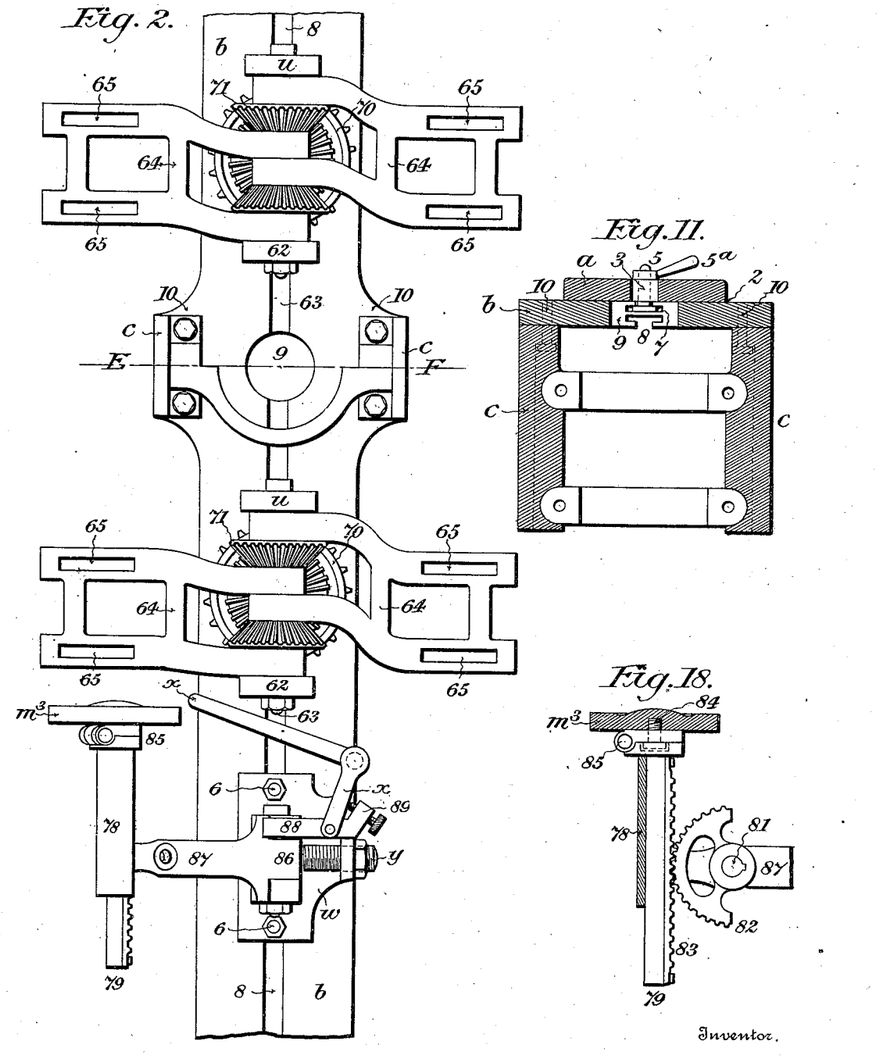
Fig. 2, Sheet 2, is a face view with parts omitted, showing the mold-supports open.
Figs. 11 to 19, inclusive, are fragmentary detail views, hereinafter more particularly described.

The improved machine has an upright frame-piece $a$, Figs. 1 and 11, having a substantial foot or base 1, a planed face 2, a longitudinal slot 3, and two or more bolt-holes 4 as its distinguishing characteristics. To the planed face of the frame-piece $a$ at a height best suited to the operative who is to work the machine a frame-plate $b$, Figs. 1 to 3 and Fig. 11, is adjustably fastened by bolts 5, extending through said bolt-holes in the former, and provided with lever-nuts $5^a$ or the like behind the frame-piece $a$. Fig. 11, Sheet 2, represents a horizontal section through said parts $a$ and $b$ on the line E F, Fig. 2. To hold the heads of said bolts 5 at any height and to hold in like manner the heads of attaching-bolts 6 at the front of the machine, the frame-plate $b$, both sides of which are planed, is provided lengthwise of both sides with undercut or T grooves 7 and 8, Fig. 11. At about two-thirds the distance from its lower end the frame-plate $b$ is provided with a hole 9, Figs. 2, 3, and 11, to coincide with said slot 3 in the frame-piece $a$, and the sides of said hole 9 are provided with lateral projections 10, to which at the face of the machine a bracket-like pillow-block $c$, Figs. 1, 6, 7, and 11, is fixedly bolted. This pillow-block $c$ is provided with brasses 11 and 12 and caps 13 and 14, Figs. 1 and 5 to 7, and within the same a hollow horizontal hub $d$ is rotatively mounted, with peripheral bearing-surfaces 15 and 16 fitted to the respective brasses and with its rear end 17, Figs. 6 and 7, out of contact with and a short distance removed from the face of the frame-plate $b$.

Figure 7:
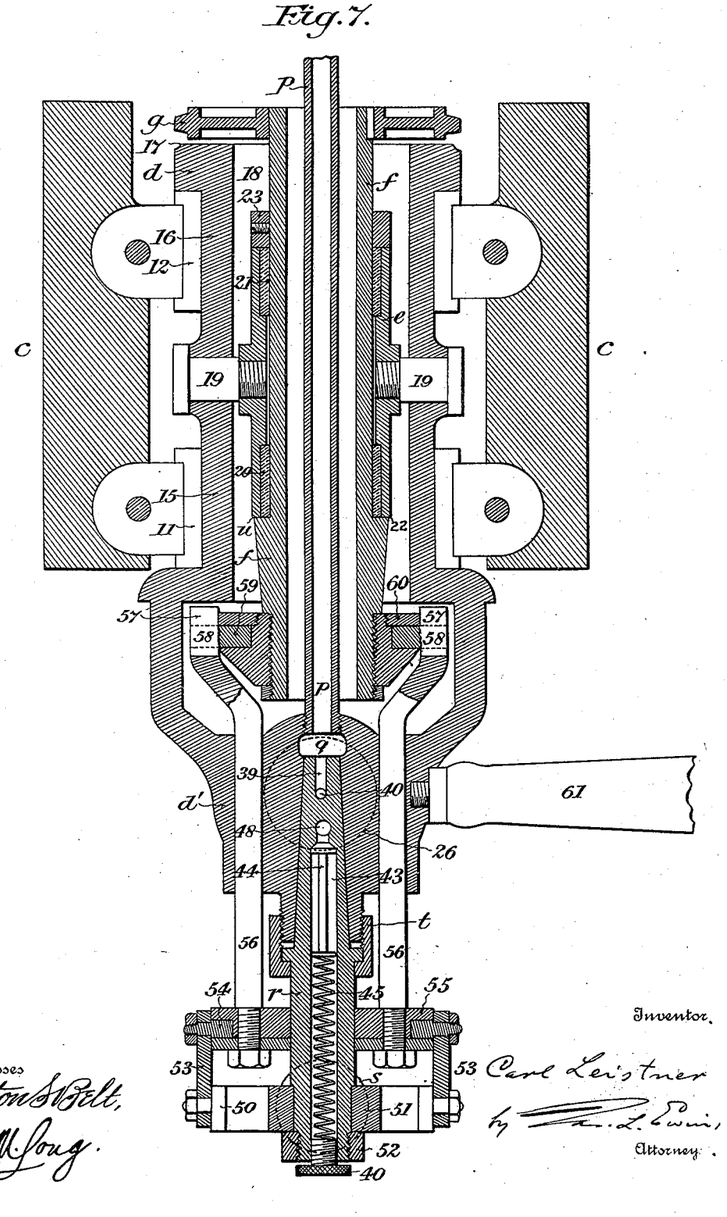
Fig. 7, Sheet 7, represents an axial horizontal section on the line C D, Fig. 4.

Within the concentric chamber 18 of the hub $d$ a short sleeve-shaped support $e$, Fig. 7, normally concentric with the hub, is mounted to rock on a pair of pivot-screws 19, diametrically opposite each other and normally horizontal, to form a rocking bearing and is provided internally with brasses 20 and 21.

Figure 5:
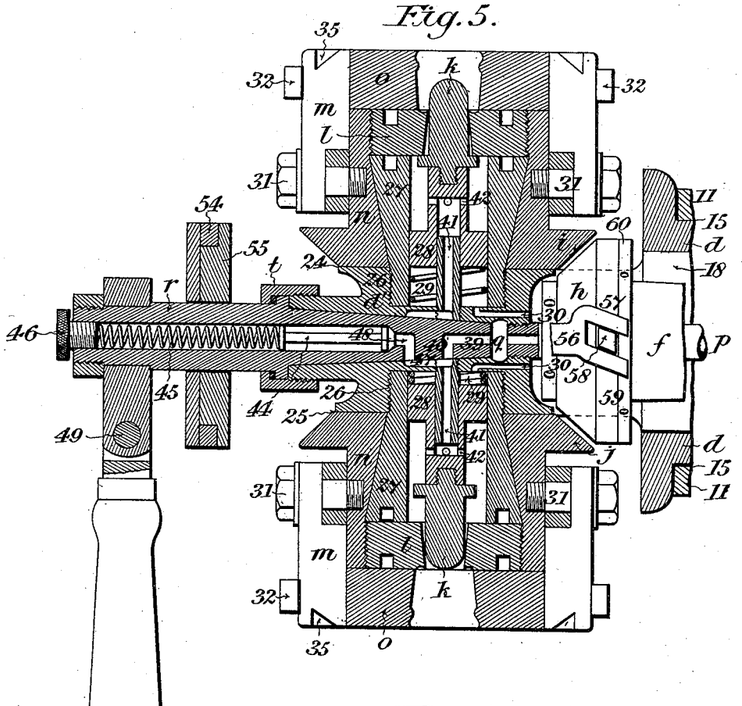
Fig. 5, Sheet 5, is a vertical section on the line A B, Fig. 4.
Figure 6:
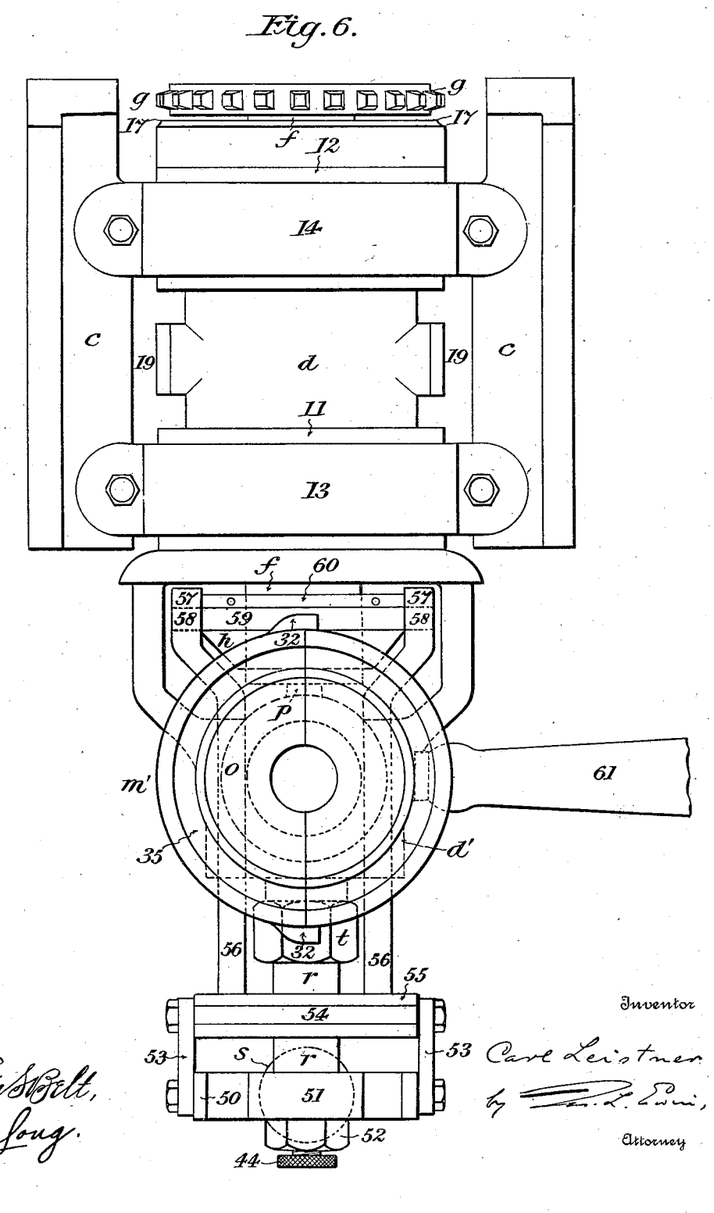
Fig. 6, Sheet 6, is a plan view of the parts shown in Fig. 4.

Within the brasses 20 and 21 a short hollow shaft $f$, Figs. 5 to 7, is rotatively mounted and is held in place against endwise displacement by a peripheral shoulder 22 and a fast collar 23, Fig. 7.

A continuously-driven sprocket-wheel $g$, Figs. 1, 6, and 7, is fast on the rear end of the hollow shaft $f$ between the rear end of the hub $d$ and the face of the frame-plate $b$, and its front end carries a beveled friction-wheel $h$, normally equidistant from and out of contact with the beveled peripheries of a pair of adjacent friction-wheels $i$ and $j$. These latter are seated on the respective ends of a short recessed body portion $d'$, hereinafter termed the "neck-mold carrier," that is integral with the hub $d$, its seats 24 and 25, Figs. 4 and 5, for said wheels $i$ and $j$, respectively, being parallel with the plane of the pivots 19 and, like the latter, normally horizontal. A central screw-threaded socket 26, Figs. 5 and 6, perpendicular to each of said seats 24 and 25, receives the threaded end of a large conical pivot 27, around which the wheel $i$ or $j$ revolves and which is recessed axially to form an air-cylinder for a hollow piston 28, Fig. 5. This piston 28 carries a normally protruding and solid mouth-core $k$, preferably and conveniently detachable therefrom, as shown, to render it interchangeable with mouth-cores of other shapes and sizes. A lip-molding screw-ring $l$, Fig. 5, likewise interchangeable with others, limits the protrusion of each mouth-core. Protrusion may be effected either by a spring 29, Fig. 5, or by air-pressure. The space containing the spring 29 is connected with the atmosphere by a vent 30.

Figure 4:
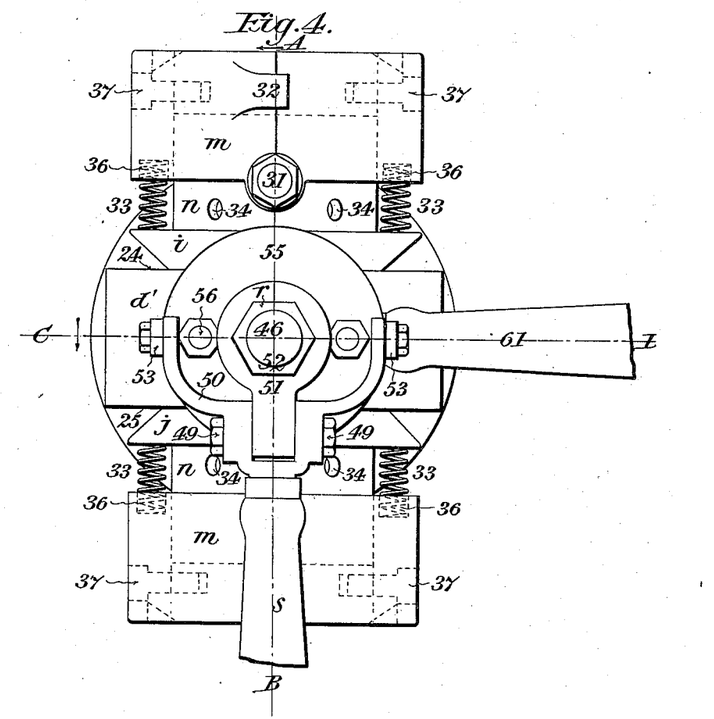
Fig. 4, Sheet 4, is a front view of the rotary central part of the machine on a larger scale.

A bisected neck-mold $m$, Figs. 4 to 6, is attached to the hub $n$ of each of the wheels $i$ and $j$ by the diametrically-arranged bolts 31, by which the parts of the mold are hinged to each other. Lugs 32 on the mold-housing aline the mold parts with each other, and spiral springs 33, Fig. 4, render the mold normally closed. Rod-sockets in the hub $n$ are shown at 34, Fig. 4, to provide for turning the mold into its opening position by hand, if need be, and an annular end groove in the mold-housing is shown at 35, Fig. 5, as means for opening the mold. The springs 33 are conveniently compressed between the face of the wheel $i$ or $j$ and the opposing end of the mold and are securely held in partially-inclosing sockets 36 therefor in the mold-housing.

Each neck-mold is provided with a two-part lining $o$, Fig. 5, the interior of which imparts the required shape to the head of a given size and style of bottle, such linings being interchangeable for others having matrical cavities of different sizes and shapes. The linings are held tightly in place within the mold-housings by screws 37, Fig. 4.

The air-pipe $p$, Figs. 1, 5, and 7, enters horizontally from behind the frame-piece $a$ through the slot 3 in the latter and the hole 9 in the frame-plate $b$ and through the interior of the hollow shaft $f$, being screwed fast at its inner end into a valve-chamber $q$, Figs. 5 and 7, in the neck-mold carrier $d'$ in line with the axis of the hub $d$. A swivel-coupling 38, Fig. 1, permits the inner length or section of the air-pipe to turn freely with the hub $d$ and neck-mold carrier $d'$ around its own longitudinal axis.

A peculiarly-recessed spigot-valve $r$, Figs. 1 and 4 to 7, is fitted into the valve-chamber $q$ and operated by a lever-handle $s$, being held to its seat by the screw-cap of a stuffing-box $t$ at its outer end. When the handle $s$ is turned toward either neck-mold, as in Fig. 5, the air is permitted to pass from the pipe $p$ through an end recess 39 and a radial port 40 of the valve into and through a central tube 41, to which the chamber of the corresponding hollow piston 28 is fitted, and through ports 42, leading from this chamber into the space between the piston and the corresponding lip-molding ring $l$. Reacting against the opposing surfaces of these parts the air forces the piston 28 into its retracted position, as at the bottom in Fig. 5, and retracts the outer end of the mouth-core $k$ into the plane of the ring, having an annular passage between the core and ring, so that the air may pass freely around the core into the cavity left thereby in the glass to blow the bottle.

To prevent excessive air-pressure within the bottle, an axial chamber 43 in the outer end of the valve $r$ is provided with a plunger 44, a spiral spring 45 behind said plunger, and a regulating-screw 46 behind the spring, and passages 47 and 48 are formed in the wall of the valve-chamber $q$ and in the valve, whereby the air as it enters the piston-chamber is caused to act on the end of the pressure-regulating plunger 44, which by receding more or less against the resistance of the spring 45 reduces the air-pressure to the standard, the resistance of the spring equalizing the air-pressure.

Figure 12:
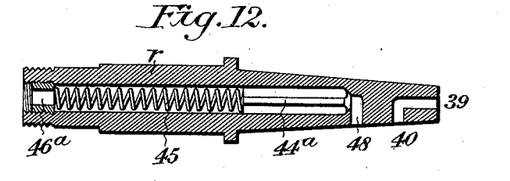
Figure 13:
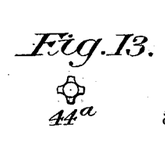
Figures 14, 17:
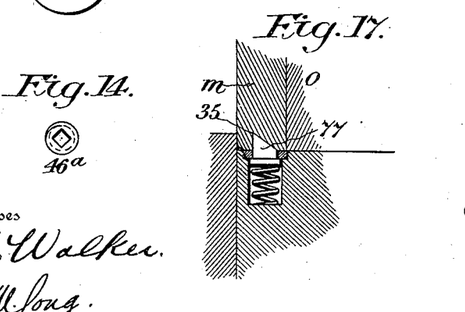

A modification of the valve $r$ is shown by Figs. 12 to 14, Sheet 5, which represent, respectively, a longitudinal section, as in Fig. 5, and end views of parts. As shown in these figures, a puppet-valve $44^a$ takes the place of the plunger 44 and a hollow screw $46^a$ takes the place of the thumb-screw 46, so that the valve may act as a vent for the escape of air when the pressure is excessive.

Figure 15:
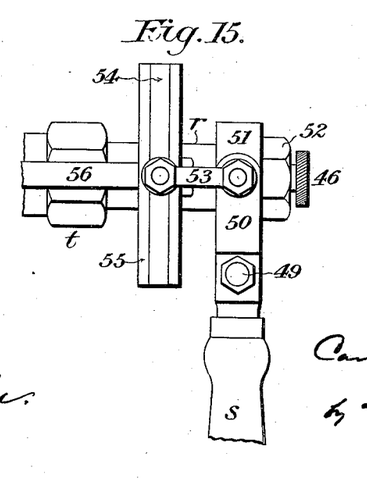

To adapt the lever-handle $s$, Figs. 4 to 7 and Fig. 15, to serve not only for the air-valve $r$, but also as means for throwing the friction-wheel $h$ into mesh with the wheel $i$ or the wheel $j$ at will to rotate either of the neck-molds $m$, the lever-handle has a transverse hinge-joint 49, the axis of which is parallel to the face of the machine and normally horizontal, and a fork 50 is rigidly attached to the hand end of the lever, so as to loosely embrace the socket-piece 51 of the same, which is secured on the squared outer end of the valve $r$ by a nut 52 in customary manner. Fig. 15, Sheet 4, is a fragmentary side view of said lever-handle $s$ and its connections.

The fork 50 is connected by a pair of links 53, Figs. 4 to 6 and Fig. 15, with a swivel-ring 54, which occupies a peripheral groove in a ring 55, concentric with the valve $r$.

A pair of rods 56 extend rearwardly from the ring 55 through guide-holes in the neck-mold carrier $d'$ and terminate at their rear ends in inclined forks 57, Figs. 5 and 7. These forks 57 embrace beveled lugs 58, diametrically opposite each other on a swivel-ring 59, and the latter is secured against endwise displacement around the hub of said friction-wheel $h$ and against its back by a screw-ring 60. The neck-molds being in normal position, as in Figs. 4 to 7, with either neck-mold at top and the lever-handle $s$ in any position, an inward thrust of the lever-handle, acting through the fork 50, links 53, rings 54 and 55, rods 56, and ring 59, rocks the sleeve $e$ on its pivot and presses the wheel $h$ into mesh with the wheel $i$ (or $j$) and rotates the upper neck-mold and its appurtenances. In like manner a pull on the lever-handle $s$ depresses the wheel $h$ and rotates the lower neck-mold and its appurtenances. A handle 61, Figs. 1, 4, and 7, projecting rigidly from the neck-mold carrier $d'$, provides for turning the latter, and therewith the neck-molds $m$, around the axis of the hub $d$ to reverse the neck-molds and to swing the parison through the air, as hereinafter described.

Figure 3:
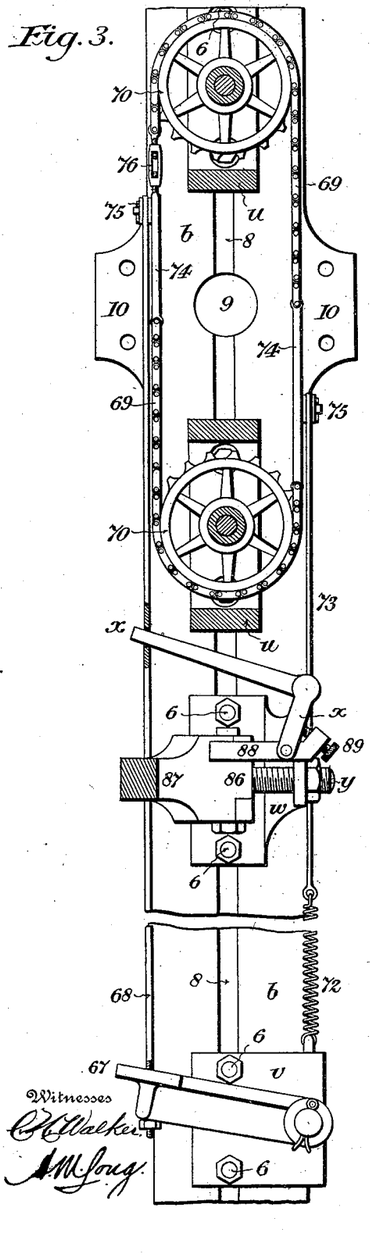
Fig. 3, Sheet 3, is a face view with parts omitted, showing the mechanism for opening and closing the molds.
Figures 8, 9, 10:
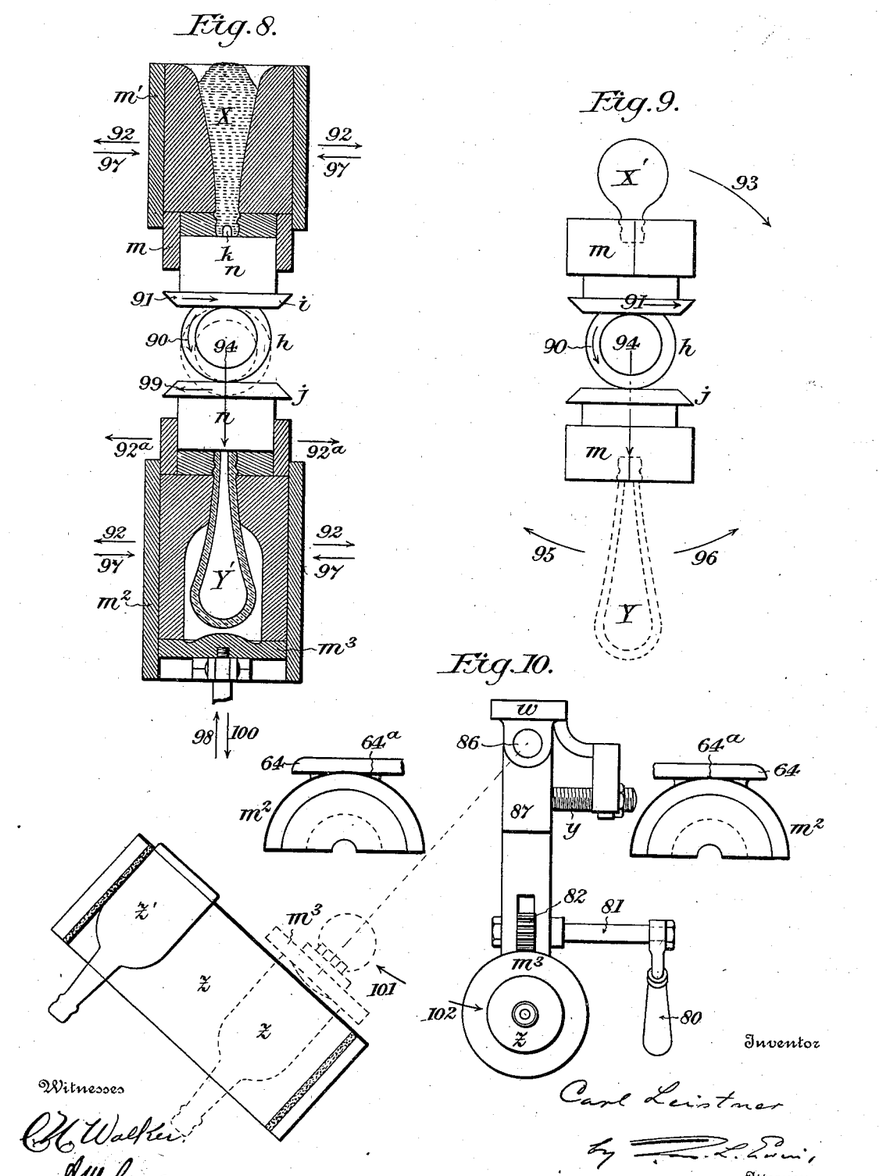
Figs. 8 and 9, Sheet 8, are diagrammatic face views illustrating the production of bottles in the improved machine.
Fig. 10, Sheet 8, is a diagrammatic plan view illustrating the discharge of the blown bottles.

A parison-mold $m'$, Fig. 1 and Fig. 8, is located above the neck-mold carrier $d'$ to coact with the neck-mold $m$ that is for the time being uppermost, and a finishing or blowing mold $m^2$, Fig. 1 and Fig. 8, is arranged beneath the neck-mold carrier to coact with the neck-mold that is for the time being at bottom. These molds, in common, comprise longitudinally-bisected housings and linings, the latter interchangeable with others in the manner above described with reference to the neck-molds $m$, and are in common mounted and operated as follows: For each of said molds $m'$ and $m^2$ a bracket $u$, Figs. 1 to 3, is attached by a pair of said screws 6 to the face of the frame-plate $b$ and is constructed with lugs 62 at top and bottom, through which a hinge-rod 63 extends. Hinged to such rod at each mold a pair of mold-supports 64 are adapted to carry the respective parts of each mold horizontally into and out of contact with each other. Horizontal slots 65 in each mold-support coact with bolts 66 therein and also with planed seats 64$^a$, Fig. 10, for the supports across the several mold parts to adjust the latter into alinement with the parts of the neck-molds $m$ and the several molds into alinement with each other and also vertically.

Figure 16:
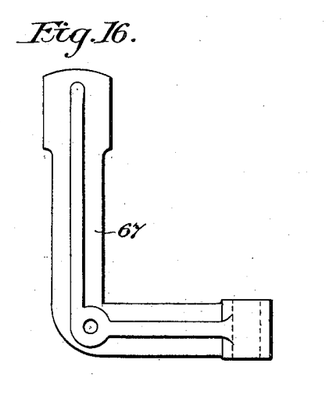

Both the molds $m'$ and $m^2$ are closed simultaneously by depressing a treadle 67, Fig. 3, a bottom view of which is represented by Fig. 16, Sheet 3. This treadle is pivoted to a bracket $v$, which is adjustably attached to the face of the frame-plate $b$ at bottom by a pair of the bolts 6 and is connected by a tension-rod 68 with an endless sprocket-chain 69. This chain embraces a pair of sprocket-wheels 70, rotatively mounted on central stud-shafts within the brackets $u$, and each sprocket-wheel is connected by miter-gearing 71, Figs. 1 and 2, with the pair of mold-supports 64.

A spring 72, Fig. 3, stretched from the bracket $v$ and connected by a tension-rod 73 with the endless sprocket-chain 69, serves to open the molds $m'$ and $m^2$ simultaneously when the treadle 67 rises and to render the molds normally open.

To coact with the upper ends of the rods 68 and 73, side portions 74, Fig. 3, of the endless chain 69 may be in the form of rods or plates, and said rods 68 and 73 may be connected thereto by pivotal studs 75 or any suitable couplings. A turnbuckle 76, Fig. 3, provides for keeping the chain taut.

A beveled spring-bolt 77, projecting from the upper end of each of the halves of the blowing-mold $m^2$, as in the sectional detail, Fig 17, Sheet 4, so as to project into the groove 35 of the bottom neck-mold, may adapt the blowing-mold to open the neck-mold sufficiently for the escape of the blown bottle downward therefrom as the blowing-mold opens. The blown bottle is thus lowered by a peculiarly-operated mold-bottom $m^3$, Figs. 1 and 2, a sectional detail of which is shown by Fig. 18, Sheet 2. A bracket $w$ therefor, Figs. 1 to 3 and Fig. 19, is adjustably attached to the face of the frame-plate $b$ by a pair of the bolts 6 and has at its outer end a vertical guide portion 78, within which the stem 79 of said bottom $m^3$ is movable vertically. A lever-handle 80, Fig. 1, is connected by a horizontal pivot 81, Fig. 18, with a toothed sector 82 within a slot in the outer portion of said bracket, and a rack 83, attached to said stem 79, meshes with the sector.

Figure 19:
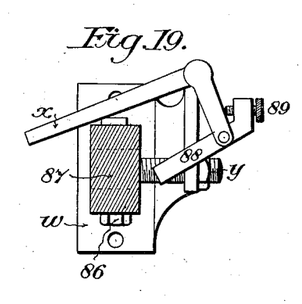

A central screw 84, Fig. 18, removably attaches the mold-bottom $m^3$, so as to render it, in common with the mold-linings, interchangeable for others of different patterns and sizes, and a hinge 85, Figs. 1, 3, and 18, both leaves of which are normally horizontal, provides for tilting the bottom to discharge the blown bottle therefrom, as in dotted lines in Fig. 10. In connection with such tilting bottom the bracket $w$ is constructed with a hinge 86, the axis of which is vertical, and provision is made for automatically swinging the outer portion 87 of the bracket, and therewith the mold-bottom $m^3$ and a bottle carried by the latter, to said dotted-line position in Fig. 10. This is effected by the coaction of a slotted portion of the treadle-rod 68, Fig. 3, with one arm of a bell-crank lever $x$, pivoted to the fixed portion of the bracket $w$ and carrying at its other extremity a pivoted pusher 88, which is rendered adjustable by a stop-screw 89, Figs. 3 and 19. The parts are shown in their positions of rest in Figs. 2 and 3. When the treadle 67 is depressed, the rod 68 moves the lever $x$ into the alternative position in which it is shown in Fig. 19, Sheet 3, which is a reproduction of a portion of Fig. 3 with the parts in different positions. Such movement of the lever $x$ retracts the pusher 88 and permits the swinging portion of the bracket $w$ to be brought by means of the lever-handle 80 against an adjustable back-stop $y$, Figs. 1, 3, 10, and 19, which alines the mold-bottom $m^3$ with the neck-molds $m$ preliminary to closing the molds $m'$ and $m^2$.

The method of producing bottles in and by the improved machine is illustrated by Figs. 8 to 10, as aforesaid.

With the parts properly adjusted and the parison and blowing molds closed, as in Fig. 1, the operative holds down the treadle 67 by his left foot (or this may be done by a mechanical detent) and starts with the lever-handle $s$ in horizontal position, which cuts off the air at the valve $r$. The attendant now puts a lump of the molten "metal" (herein termed the "glass") in the parison-mold $m'$, and the same immediately fills the upper neck-mold $m$, flowing around the mouth-core $k$ within the same and into contact with the subjacent lip-forming ring $l$, as at the top in Fig. 8. The friction-wheel $h$ being in motion, as represented by the arrow 90, Figs. 8 and 9, the operative now presses inward the lever-handle $s$, pulling rods 53 outward, and causes said neck-mold, and therewith the parison X, to rotate, as indicated by the arrow 91, Fig. 8. Such rotation of the parison in contact with the interior of the relatively stationary parison-mold $m'$ tends to render its exterior homogeneous and to take the place of marvering. The parison and blowing molds $m'$ and $m^2$ are now opened, as represented by the arrows 92, Fig. 8, and the newly-exposed parison X', Fig. 9, is swung around the horizontal axis of the hub $d$ by the handle 61 of the neck-mold carrier, as represented by the arrow 93. At the end of this movement the parison hangs exposed at bottom, as shown in dotted lines at Y, Fig. 9. The lever-handle $s$ is now turned downward and air is admitted through the valve $r$ to the mouth of the parison, as represented by the arrows 94. Should the parison fail to elongate as soon as air is admitted, it is swung by means of the handle 61, as represented by the arrows 95 and 96, Fig. 9, as in mouth-blowing. As soon as the depending parison is ready for the blowing-mold the molds $m'$ and $m^2$ are again closed, as represented by the arrows 97, Fig. 8, and the mold-bottom $m^3$ is elevated to its effective molding position, as represented by the arrow 98, Fig. 8. The blowing of the inclosed hollow parison Y', Fig. 8, is then completed, the cushioning-plunger 44 or vent-valve 44ª within the valve $r$ serving meanwhile to prevent excessive air-pressure. Such regulation of the air-pressure is of special importance in blowing turned bottles, as only a certain air-pressure can be used in this operation. Excessive or irregular air-pressure presses the glass so tightly against the walls of the blowing-mold as to prevent turning the bottle. For making turned bottles it is only necessary to pull the lever-handle $s$ outward, so as to throw the friction-wheel $h$ into mesh with the wheel $j$ of the lower neck-mold $m$, as shown in dotted lines in Fig. 8, which causes the latter and therewith the inchoate bottle Y' to rotate, as represented by the arrow 99. While a bottle is being blown, as above, at the bottom the casting of another parison X is progressing at the top, as represented by Fig. 8. When another parison X is ready and the blowing of the inclosed parison Y' is completed, the molds are opened again, (arrows 92,) and the lower neck-mold $m$ opening with the blowing-mold $m^2$, as represented by the arrows 92ª, the blown bottle Z, Fig. 10, is released, so as to be lowered with the mold-bottom $m^3$, as represented by the arrow 100, Fig. 8. Meanwhile the parts of the blowing-mold $m^2$ swing wide apart, as shown in Fig. 10, and the laterally-swinging support of the bottom $m^3$ is thrown to the left, as above described with reference to Figs. 1, 10, and 19. Said lateral movement is represented by the arrow 101, Fig. 10. The bottom $m^3$ is then tilted, as shown in dotted lines in Fig. 10, and the bottle Z is deposited in an asbestos-lined receptacle $z$, Fig. 10, at its higher end, from whence it rolls to a position of rest in the receptacle, as represented by a blown bottle Z', to be removed to the annealing-oven at convenience. The return movement of the bottom $m^3$ is represented by the arrow 102, Fig. 10.

By reason of the organization of the improved machine as above it is not necessary for any one operation to wait on another when making bottles not turned, no time is lost, and the output of a given operative is materially increased.

The handle 61 may project from the left-hand side of the neck-mold carrier $d'$, so as to bring the lever-handle $s$ opposite the right hand when the valve $r$ is shut, or a handle 61 may project from each side, and other like modifications will suggest themselves to those skilled in the art.

If it were not for swinging the naked parison through the air, it would be practicable to admit air into the same before it is reversed by simply turning the hand-lever $s$ upward toward it. The blowing may thus begin in modifications of the improved machine.

The term "air" as herein used is intended to include other bottle-blowing fluids—as, for example, steam.

Having thus described said improvement, I claim as my invention and desire to patent under this specification—

1. A machine for making glass bottles having, in combination, a pair of normally vertical neck-molds movable around a horizontal axis, a parison-mold adapted to be alined with said neck-molds in succession at top, a blowing-mold adapted to be alined with the same in succession at bottom, and means for introducing the air.

2. A machine for making glass bottles having, in combination, a pair of normally vertical neck-molds movable around a horizontal axis, a parison-mold adapted to be alined with said neck-molds in succession at top, a blowing-mold adapted to be alined with the same in succession at bottom, means for transmitting rotary motion to either neck-mold at will, and means for introducing the air.

3. A machine for making glass bottles having, in combination, a pair of normally vertical neck-molds movable around a horizontal axis, a parison-mold adapted to be alined with said neck-molds in succession at top, a blowing-mold adapted to be alined with the same in succession at bottom, and an air-supply device common to both neck-molds.

4. A machine for making glass bottles having, in combination, a pair of normally vertical neck-molds movable around a horizontal axis, a parison-mold adapted to be alined with said neck-molds in succession at top, a blowing-mold adapted to be alined with the same in succession at bottom, means for transmitting rotary motion to either neck-mold at will, comprising a shaft substantially concentric with said horizontal axis and means for continuously rotating said shaft, and means for introducing the air.

5. A machine for making glass bottles having, in combination, a pair of normally vertical neck-molds movable around a horizontal axis, a parison-mold adapted to be alined with said neck-molds in succession at top, a blowing-mold adapted to be alined with the same in succession at bottom, and an air-supply device common to both neck-molds, comprising an inlet-pipe and a spigot-valve concentric with said horizontal axis.

6. A machine for making glass bottles having, in combination, a pair of neck-molds, normally vertical, arranged back to back, and movable around a horizontal axis common to both, a longitudinally-bisected parison-mold adapted to be alined with said neck-molds in succession at top, a longitudinally-bisected blowing-mold adapted to be alined with said neck-molds in succession at bottom, and mechanism for opening and closing said parison-mold and said blowing-mold simultaneously.

7. A machine for making glass bottles having, in combination, a pair of neck-molds, normally vertical, arranged back to back, and movable around a horizontal axis common to both, a longitudinally-bisected parison-mold adapted to be alined with said neck-molds in succession at top, a longitudinally-bisected blowing-mold adapted to be alined with said neck-molds in succession at bottom, and mechanism for opening and closing said parison-mold and said blowing-mold simultaneously, comprising a treadle, a tension-rod coupled thereto, an endless sprocket-chain, a pair of sprocket-wheels embraced by said chain, and miter-gearing transmitting motion from each sprocket-wheel to the parts of one of the molds last named.

8. A machine for making glass bottles having, in combination, a pair of neck-molds, normally vertical, arranged back to back, and movable around a horizontal axis common to both, a longitudinally-bisected parison-mold adapted to be alined with said neck-molds in succession at top, a longitudinally-bisected blowing-mold adapted to be alined with said neck-molds in succession at bottom, means for retracting the parts of said parison-mold and said blowing-mold, and means for swinging the stripped parison from the normal position of said parison-mold to the normal position of said blowing-mold, and for swinging the same in its depending position to elongate the parison.

9. A machine for making glass bottles having, in combination with means for introducing the air, a pair of longitudinally-bisected neck-molds, normally vertical, arranged back to back, and movable around a horizontal axis common to both, a parison-mold adapted to be alined with said neck-molds in succession at top, a bisected blowing-mold, having laterally-movable parts, adapted to be alined with said neck-molds in succession at bottom, means for simultaneously opening the blowing-mold and the neck-mold in communication therewith sufficiently to release the blown bottle, and means for lowering the blown bottle.

10. A machine for making glass bottles having, in combination with means for introducing the air, a pair of longitudinally-bisected neck-molds, normally vertical, arranged back to back, and movable around a horizontal axis common to both, a parison-mold adapted to be alined with said neck-molds in succession at top, a bisected blowing-mold, having laterally-movable parts, adapted to be alined with said neck-molds in succession at bottom, means for simultaneously opening the blowing-mold and the neck-mold in communication therewith sufficiently to release the blown bottle, means for lowering the blown bottle, and means for moving the blown bottle laterally to a discharge-point.

11. A machine for making glass bottles having, in combination with means for introducing the air, a pair of longitudinally-bisected neck-molds, normally vertical, arranged back to back, and movable around a horizontal axis common to both, a parison-mold adapted to be alined with said neck-molds in succession at top, a bisected blowing-mold, having laterally-movable parts, adapted to be alined with said neck-molds in succession at bottom, means for simultaneously opening the blowing-mold and the neck-mold in communication therewith sufficiently to release the blown bottle, means for lowering the blown bottle, and means for moving the blown bottle laterally to a discharge-point, comprising a mold-bottom adapted to be tilted.

12. A machine for making glass bottles having, in combination with means for introducing the air, a pair of longitudinally-bisected neck-molds, normally vertical, springs which render the same normally closed, means for revolving the closed neck-molds around a horizontal axis, a parison-mold adapted to be alined with said neck-molds in succession at top, a bisected blowing-mold, having laterally-movable parts, adapted to be alined with said neck-molds in succession at bottom, and means whereby the separation of said parts of the blowing-mold opens the neck-mold in communication therewith.

13. In a machine for making glass bottles by casting and blowing, the combination with means for introducing the air and with parison and blowing molds of a neck-mold with which such parison-mold and such blowing-mold are alined in succession, a support for the same having a cylinder within it, a piston movable within said cylinder, a mouth-core carried by said piston, means for rendering said mouth-core normally protruded for the casting operation, and means for retracting said mouth-core by the air on its way to the interior of the bottle.

14. In a machine for making glass bottles by casting and blowing, the combination with means for introducing the air and with parison and blowing molds of a neck-mold with which such parison-mold and such blowing-mold are alined in succession, a support for the same having a cylinder within it, a piston movable within said cylinder, a mouth-core carried by said piston, a spring arranged behind said piston within said cylinder which renders said mouth-core normally protruded for the casting operation, and means for retracting said mouth-core by the air on its way to the interior of the bottle.

15. In a machine for making glass bottles by casting and blowing, the combination with means for introducing the air and with parison and blowing molds of a neck-mold with which such parison-mold and such blowing-mold are alined in succession, a support for the same having an axial cylinder within it, a piston movable within said cylinder, a mouth-core carried by said piston, a spring arranged behind said piston within said cylinder which renders said mouth-core normally protruded for the casting operation, and means for retracting said mouth-core by the air on its way to the interior of the bottle, such means comprising an inlet-pipe, a chambered neck-mold carrier to which said pipe is coupled, a hand-actuated valve within said carrier, and an open-ended tube embraced by said piston and in communication with said pipe by way of said valve in one position of the lever-handle.

16. In a machine for making glass bottles by casting and blowing, the combination with means for introducing the air, and with parison and blowing molds, of a neck-mold with which such parison-mold and such blowing-mold are alined in succession, a rotatable support for the same having a conical bore concentric with the neck-mold, a neck-mold carrier having a seat for said rotatable support and a concentric tapped bore, a cylinder-forming hollow screw fitted to said bores, a piston within such cylinder, a normally-protruding mouth-core carried by said piston, and means for retracting said mouth-core by the air on its way to the interior of the bottle.

17. In a machine for making glass bottles by casting and blowing, the combination with means for introducing the air, and with parison and blowing molds, of a neck-mold with which such parison-mold and such blowing-mold are alined in succession, a separable mouth-core within the same interchangeable with others of different shapes and sizes, means for rendering such mouth-core normally protruded, and an interchangeable lip-molding ring surrounding said mouth-core and limiting its protrusion.

18. The combination, in a machine for making glass bottles, of a vertical parison-mold, a subjacent neck-mold alined therewith and rotatable around its longitudinal axis, a shaft substantially at right angles to the axis of said neck-mold, means for continuously rotating said shaft, a bearing for said shaft having diametrical pivots, means for tilting said bearing on said pivots, a friction-wheel carried by said shaft, and a driven friction-wheel by which said neck-mold is carried.

19. The combination, in a machine for making glass bottles, of a vertical parison-mold, a subjacent neck-mold alined therewith and rotatable around its longitudinal axis, a shaft substantially at right angles to the axis of said neck-mold, means for continuously rotating said shaft, a bearing for said shaft having diametrical pivots, means for tilting said bearing on said pivots, a friction-wheel carried by said shaft, a driven friction-wheel by which said neck-mold is carried, and means for tilting said bearing comprising a swiveled ring surrounding said shaft and provided with beveled lugs, rods having oblique forks engaged with said lugs, a connecting-ring to which said rods are attached, a ring swiveled to said connecting-ring, and a lever-handle connected with the ring last named.

20. The combination, in a machine for making glass bottles, of a neck-mold, a blowing-mold vertically alined therewith, means for introducing the air, and means for rotating the neck-mold, the latter comprising a shaft substantially at right angles to the axis of said neck-mold, means for continuously rotating said shaft, a bearing for said shaft having diametrical pivots, means for tilting said bearing on said pivots, a friction-wheel carried by said shaft and a driven friction-wheel by which said neck-mold is carried.

21. The combination, in a machine for making glass bottles, of a neck-mold, a blowing-mold vertically alined therewith, means for introducing the air, and means for rotating the neck-mold, the latter comprising a shaft substantially at right angles to the axis of said neck-mold, means for continuously rotating said shaft, a bearing for said shaft having diametrical pivots, a friction-wheel carried by said shaft, a driven friction-wheel by which said neck-mold is carried, and means for tilting said bearing comprising a swiveled ring surrounding said shaft and provided with beveled lugs, rods having oblique forks engaged with said lugs, a connecting-ring to which said rods are attached, a ring swiveled to said connecting-ring, and a lever-handle connected with the ring last named.

22. The combination, in a machine for making glass bottles, of a neck-mold adapted to be rotated, a subjacent blowing-mold vertically alined therewith, and means for introducing the air and for rotating the glass at will, such means comprising a lever-handle common to both operations and having a hand end movable in different planes, a spigot-valve turned by said lever-handle, a fork carried by the inner end of said lever-handle, a swiveled ring to which said fork is connected, a connecting-ring carrying said swiveled ring, rods attached at one end to said connecting-ring and having oblique forks at their other ends, a swiveled ring having beveled lugs embraced by said forks, a continuously-driven shaft, and friction-gearing, thrown into and out of mesh by the edgewise movement of the ring last named, for transmitting motion from said shaft to the neck-mold.

23. The combination, in a machine for making glass bottles, of a pair of neck-molds, arranged back to back, adapted to be rotated and to be moved around a horizontal axis into alternative vertical positions, a parison-mold and a blowing-mold alined with the respective neck-molds, and means for introducing the air and for rotating the glass at will, such means comprising a lever-handle common to both operations and having a hand end movable in different planes, a spigot-valve, concentric with said horizontal axis, turned by said lever-handle, a fork carried by the inner end of said lever-handle, a swiveled ring to which said fork is connected, a connecting-ring carrying said swiveled ring, rods attached at one end to said connecting-ring and having oblique forks at their other ends, a swiveled ring having beveled lugs embraced by said forks, a continuously-driven shaft, and friction-gearing, thrown into and out of mesh by the edgewise movement of the ring last named, for transmitting motion from said shaft to either neck-mold, substantially as hereinbefore specified.

CARL LEISTNER.

Witnesses:
H. D. JAMESON,
A. NUTTING.